(12) United States Patent
Jiang et al.

(10) Patent No.: US 8,792,785 B2
(45) Date of Patent: Jul. 29, 2014

(54) CIRCUIT FOR MONITORING THE RECEIVER OF AN OPTICAL TRANSCEIVER AND THE METHOD FOR MONITORING BURST MODE OPTICAL POWER THEREOF

(75) Inventors: Xu Jiang, Sichuan Province (CN); Xin Shuai, Sichuan Province (CN); Bing Ju, Sichuan Province (CN); Yi Yang, Sichuan Province (CN)

(73) Assignee: Source Photonics, Inc., Chatsworth, CA (US)

( * ) Notice: Subject to any disclaimer, the term of this patent is extended or adjusted under 35 U.S.C. 154(b) by 150 days.

(21) Appl. No.: 13/478,813

(22) Filed: May 23, 2012

(65) Prior Publication Data
US 2013/0108261 A1 May 2, 2013

(30) Foreign Application Priority Data

Oct. 26, 2011 (CN) .......................... 2011 1 0329551

(51) Int. Cl.
H04B 17/00 (2006.01)
H04B 10/06 (2006.01)

(52) U.S. Cl.
USPC ................ 398/38; 398/37; 398/202; 398/208

(58) Field of Classification Search
USPC ...................... 398/37, 38, 202, 208
See application file for complete search history.

(56) References Cited

U.S. PATENT DOCUMENTS

| 7,217,914 | B2 * | 5/2007 | Stewart et al. | 250/214 R |
|---|---|---|---|---|
| 7,495,203 | B2 * | 2/2009 | Kaku et al. | 250/214 A |
| 7,970,291 | B2 * | 6/2011 | Nagakubo | 398/208 |
| 8,027,594 | B2 * | 9/2011 | Yano | 398/202 |
| 8,242,430 | B2 * | 8/2012 | Dyer | 250/214 R |
| 2012/0099857 | A1 * | 4/2012 | Zhang et al. | 398/38 |

* cited by examiner

*Primary Examiner* — Dalzid Singh
(74) *Attorney, Agent, or Firm* — Murabito Hao & Barnes LLP; Andrew D. Fortney (57) ABSTRACT

A circuit for monitoring an optical receiver or transceiver, architectures, circuits, and systems including the same, and a method for monitoring received optical power are disclosed. The receiver monitoring circuit comprises an avalanche photodiode (APD), a microprocessor, and first and second transresistance amplifiers. The microprocessor is configured to supply bias voltage to the APD. Photocurrent produced by the APD is supplied to the first and second transresistance amplifiers, and then the microprocessor captures optical power from the voltage signal of the first and second transresistance amplifiers. By algorithms and microprogramming systems, the circuit for monitoring the optical receiver and method of monitoring optical power enables precision compensation for monitoring burst mode optical power in commercial temperature ranges and powers, and also can be applied to high precision digital monitoring of optical transceivers in a PON system in the commercial temperature range with error values within ±1 dB.

25 Claims, 6 Drawing Sheets

| 25 °C | | |
|---|---|---|
| Rx power (dBm) | RSSI test (dBm) | △ (dBm) |
| -31 | -30.84 | 0.16 |
| -30 | -30 | 0 |
| -29 | -29.03 | -0.03 |
| -28 | -27.96 | 0.04 |
| -27 | -27.04 | -0.04 |
| -26 | -26.06 | -0.06 |
| -25 | -24.95 | 0.05 |
| -24 | -23.95 | 0.05 |
| -23 | -23.01 | -0.01 |
| -22 | -22.02 | -0.02 |
| -21 | -20.98 | 0.02 |
| -20 | -19.98 | 0.02 |
| -19 | -18.96 | 0.04 |
| -18 | -17.92 | 0.08 |
| -17 | -16.98 | 0.02 |
| -16 | -15.96 | 0.04 |
| -15 | -15.01 | -0.01 |
| -14 | -14 | 0 |
| -13 | -12.98 | 0.02 |
| -12 | -12 | 0 |
| -11 | -11.01 | -0.01 |
| -10 | -9.92 | 0.08 |
| -9 | -8.97 | 0.03 |
| -8 | -7.91 | 0.09 |
| -7 | -6.98 | 0.02 |
| -6 | -6.01 | -0.01 |
| -5 | -5.09 | -0.09 |

FIG. 5

| 0 °C | | | 70 °C | | |
|---|---|---|---|---|---|
| Rx power (dBm) | RSSI test (dBm) | Δ (dBm) | Rx power (dBm) | RSSI test (dBm) | Δ (dBm) |
| -31 | -31.25 | -0.25 | -31 | -30.46 | 0.54 |
| -30 | -29.89 | 0.11 | -30 | -30.11 | -0.11 |
| -29 | -28.62 | 0.38 | -29 | -29.21 | -0.21 |
| -28 | -27.27 | 0.73 | -28 | -28.78 | -0.78 |
| -27 | -26.34 | 0.66 | -27 | -28.1 | -1.1 |
| -26 | -25.16 | 0.84 | -26 | -27.21 | -1.21 |
| -25 | -23.9 | 1.1 | -25 | -26.73 | -1.73 |
| -24 | -22.88 | 1.12 | -24 | -25.89 | -1.89 |
| -23 | -21.9 | 1.1 | -23 | -24.88 | -1.88 |
| -22 | -20.92 | 1.08 | -22 | -23.95 | -1.95 |
| -21 | -19.85 | 1.15 | -21 | -23.08 | -2.08 |
| -20 | -18.88 | 1.12 | -20 | -22.16 | -2.16 |
| -19 | -17.81 | 1.19 | -19 | -21.34 | -2.34 |
| -18 | -16.85 | 1.15 | -18 | -20.28 | -2.28 |
| -17 | -15.88 | 1.12 | -17 | -19.33 | -2.33 |
| -16 | -14.97 | 1.03 | -16 | -18.36 | -2.36 |
| -15 | -13.97 | 1.03 | -15 | -17.35 | -2.35 |
| -14 | -13.04 | 0.96 | -14 | -16.28 | -2.28 |
| -13 | -12.03 | 0.97 | -13 | -15.3 | -2.3 |
| -12 | -11.11 | 0.89 | -12 | -14.24 | -2.24 |
| -11 | -10.1 | 0.9 | -11 | -13.24 | -2.24 |
| -10 | -9.15 | 0.85 | -10 | -12.18 | -2.18 |
| -9 | -8.23 | 0.77 | -9 | -11.14 | -2.14 |
| -8 | -7.23 | 0.77 | -8 | -10.03 | -2.03 |
| -7 | -6.31 | 0.69 | -7 | -8.97 | -1.97 |
| -6 | -5.46 | 0.54 | -6 | -7.84 | -1.84 |
| -5 | -4.64 | 0.36 | -5 | -6.87 | -1.87 |

FIG. 8

CIRCUIT FOR MONITORING THE RECEIVER OF AN OPTICAL TRANSCEIVER AND THE METHOD FOR MONITORING BURST MODE OPTICAL POWER THEREOF

CROSS REFERENCE TO RELATED APPLICATION

This application claims the benefit of Chinese Patent Application No. 201110329551.9 filed on Oct. 26, 2011, and hereby incorporated by reference as if fully set forth herein.

FIELD OF THE INVENTION

The present invention generally relates to photonics communication technology (e.g., optical devices such as optical receivers, transmitters, transceivers, etc.). More specifically, the present invention relates to methods, algorithms, architectures, circuits, software, and/or systems for monitoring burst mode optical power in an optical device.

DISCUSSION OF THE BACKGROUND

In a conventional optical receiver, monitoring an input optical power of an avalanche photodiode (APD) involves measuring a photocurrent flowing past the APD ($I_{apd}$) using a current monitoring controller chip. Namely, the current monitoring controller chip outputs a mirror current $I_{apd1}$ of the photocurrent $I_{apd}$, and then an analog-to-digital converter (ADC) samples and converts the mirror current $I_{apd1}$ into a digital signal $ADC\_I_{apd}$ representative of the analog current $I_{apd1}$. In embodiments wherein various input optical power values are received, various photocurrent values of $I_{apd}$ are provided to the APD and subsequently converted to digital form (e.g., a current $ADC\_I_{apd}$). The digital values of $I_{apd}$, $ADC\_I_{apd}$, can then be utilized to form a current v. power graph, wherein the sampled ADC values of $I_{apd}$ are plotted as the horizontal coordinates, and corresponding optical powers are plotted (in μW) as vertical coordinates. Based on this curve/graph, the least squares method can be used to obtain parameters a, b, c, d, and e of the following quadratic polynomial: $P_{input}$ (μW)=$(a*ADC\_I_{apd}^4)+(b*ADC\_I_{apd}^3)+(c*ADC\_I_{apd}^2)+(d*ADC\_I_{apd})+e$. If a real-time current value $ADC\_I_{apd}$ is obtained via sampling, it can obtain an input optical power value by entering the $ADC\_I_{apd}$ value into the above-mentioned equation. However, this mode is only compatible with the monitoring of continuous optical power signals.

Furthermore, since APDs are sensitive to bias voltage $V_{apd}$ and ambient temperature, different APDs produce various photocurrents $I_{apd}$ at the same input optical power, but with different bias voltages $V_{apd}$. Also, different APDs produce various photocurrents $I_{apd}$ at the same bias voltage $V_{apd}$ and input optical power, but at different temperatures. Therefore, conventional ways of monitoring the APD input optical power may have low precision, with an error control between ±3 dB.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention relate to methods, algorithms, architectures, circuits, software, and/or systems for monitoring an operational parameter (e.g., an input optical power) of a photodiode (e.g., an APD) in an optical receiver. More specifically, the present invention is intended to fix the above-mentioned defects in existing technologies, and provide an optical transceiver monitoring circuit capable of increasing the precision of burst mode optical signal monitoring, and a method for monitoring the burst mode optical power thereof.

In one embodiment, the optical receiver monitoring circuit comprises an avalanche photodiode (APD), a microprocessor, a first amplifier having a first gain and configured to receive a first current from the APD, and a second amplifier having a second gain different from the first gain and configured to receive a second current from the APD, wherein the microprocessor is configured to supply a bias voltage to the APD and/or determine an optical power from voltage signals received from the first and second amplifiers. The optical receiver monitoring circuit may monitor the receiver of a DDMI optical transceiver (i.e., an optical transceiver having a digital diagnostic monitoring interface). In another example, the microprocessor is configured to supply the bias voltage to the APD from a DAC or via a DAC port.

In further embodiments, the monitoring circuit comprises a current mirror configured to convert photocurrent received by the APD into the first and second currents, the second current having a value different from the first current, and/or provide the first and second currents to the first and second amplifiers, respectively. The current mirror may comprise a multipath constant flow source. Also, the microprocessor may provide a boosted or amplified voltage from the DAC or DAC port to the current mirror.

In another embodiment of the present invention, the first transresistance amplifier may be connected to the microprocessor (or first analog-to-digital converter [ADC]) via a first sampling circuit, and the second transresistance amplifier may be connected to the microprocessor (or second analog-to-digital converter [ADC]) via a second sampling circuit. The first sampling circuit may be further connected to the microprocessor via a first voltage follower, and the second sampling circuit may be further connected to the microprocessor via a second voltage follower. The signals of the first and second voltage followers may be converted into digital monitoring values by the microprocessor.

In a further embodiment, the present invention provides a circuit for monitoring an optical receiver or transceiver, comprising an ADP whose cathode is connected to a power supply, a microprocessor with a first ADC port, a second ADC port and a DAC port, and first and second transresistance amplifiers, wherein the circuit for monitoring the optical receiver or transceiver may further comprise a current mirror configured to connect the anode of the APD to the first and second transresistance amplifiers. In this embodiment, the microprocessor may be configured to provide a boosted or amplified voltage circuit from the DAC or via the DAC port; the boosted or amplified voltage may be provided to the mirror current; the first transresistance amplifier may be connected to the microprocessor via a first sampling circuit; the microprocessor may be connected to a first voltage follower via the first ADC port; and/or the first transresistance amplifier, first voltage follower and first ADC port may form a first channel. In addition, the second transresistance amplifier may be connected to the microprocessor via a second sampling circuit; the microprocessor may be connected to a second voltage follower via the second ADC port; and/or the second transresistance amplifier, second voltage follower and second ADC port may form a second channel.

According to embodiments of the present invention, the first and second channels are individual channels with different gains. The first channel may have a low gain, while the second channel may have a high gain. The microprocessor may choose the first channel or the second channel to monitor optical power based on various requirements so as to expand the optical power monitoring range of the circuit for monitoring the optical receiver or transceiver.

In further embodiments, the photocurrent produced by the APD may be converted by a current mirror into first and second currents having different strengths. The first current may be received by the first transresistance amplifier in the first channel and converted into a first voltage, and the first voltage can be supplied to a first voltage follower after being sampled by a first sampling retaining circuit, and then can be supplied to the first ADC port of the microprocessor. Also, the second current may be received and converted into a second voltage by the second transresistance amplifier in the second channel, and the second voltage can be supplied to the second voltage follower after being sampled by a second sampling retaining circuit, and then can be supplied to the second ADC port of the microprocessor. The current mirror may be a multipath constant flow source.

In another aspect of the present invention, a method of monitoring burst mode optical power comprises measuring a current temperature, comparing the measured current temperature with a threshold temperature and determining whether to select a low temperature function or a high temperature function; determining the optical power values of first and second channels, capturing the optical power value(s) of the first channel or the second channel based on different power ranges, and converting the optical power value(s) into one or more final optical power values at a standard temperature; and determining piecewise power functions relative to the final optical power value(s) based the final optical power value(s) at standard temperature, and calculating a received optical power from the final optical power values and the piecewise power functions. For example, the optical power values may be converted to digital optical power values using an analog-to-digital converter (ADC).

According to an embodiment of the present invention, if the measured temperature is greater than the threshold temperature, the high temperature function is selected and used. Alternatively or additionally, if the measured temperature is less than the threshold temperature, the low temperature function is selected and used. In one example, the threshold temperature may be 25 degrees centigrade (° C.).

In further embodiments, determining and converting the optical power values may comprise comparing the optical power value(s) of the second channel with a threshold optical power value, and determining optical power values at different temperatures to calculate the optical power based on the comparison result. In one example, the threshold optical power value is a threshold optical power of the second channel captured at the standard operating temperature. For example, if the optical power value(s) of the second channel>the threshold optical power value, the optical power value(s) of the first channel is selected and used to calculate the power, and the optical power value at a given temperature is the (corresponding) optical power value(s) of the first channel. Alternatively or additionally, if the optical power value(s) of the second channel is less than the threshold optical power value, the optical power value of the second channel is selected and used to calculate the power, and the optical power value at the given temperature is the optical power value(s) of the second channel.

According to a further embodiment of the present invention, the method further comprises determining the slope and offset of a conversion function that converts the optical power values at various temperatures (ADC_temps) into final optical power values at the standard temperature based on the results of comparing the optical power values at various temperatures with the optical power values at different power thresholds. For example, in the case where the optical power value at a given temperature is the optical power value of the first channel and the current temperature is less than the threshold temperature, if the optical power value at a given temperature is greater than ADC1_15+(ADC1_15L−ADC1_15)*(the current temperature−temp N)/(temp L−temp N), then the slope=slope1_15~5L and the offset=offset1_15~5L, where slope1-15~5L and offset1-15~5L are the slope and offset of the conversion function for a low temperature optical power in the range −5 dBm~−15 dBm in the first channel 1; ADC1_15 represents the optical power value of the first channel as the input optical power reaches −15 dBm at an ambient temperature of 25 degrees centigrade, and ADC1_15L represents the optical power value of the first channel as the input optical power reaches −15 dBm at an ambient temperature of 0 degrees centigrade; temp N represents a normal temperature, and temp L represents a low temperature.

In another example, in the case where the optical power value at a given temperature is the optical power value of the first channel and the current temperature is less than the threshold temperature, if the optical power value at a given temperature is less than ADC1_15+(ADC1_15L−ADC1_15)*(the current temperature−temp N)/(temp L−temp N), then slope=slope1_25~15L, offset=offset1_25~15L, where slope1-25~15L and offset1-25~15L are the slope and offset of the conversion function for a low temperature optical power in the range of −25 dBm~−15 dBm in the first channel; ADC1_15 represents the optical power value of the first channel as the input optical power reaches −15 dBm at an ambient temperature of 25 degrees centigrade, and ADC1_15L represents the optical power value of the first channel as the input optical power reaches −15 dBm at an ambient temperature of 0 degree centigrade; temp N represents the normal temperature, and temp L represents the low temperature.

In a further example, in the case where the optical power value at a given temperature is the optical power value of the second channel and the current temperature is less than the threshold temperature, if the optical power value at a given temperature is less than ADC2_25+(ADC2_25L−ADC2_25)*(the current temperature−temp N)/(temp L−temp N), then slope=slope2_33~25L and offset=offset2_33~25L, where slope2-33~15L and offset2-33~25L are the slope and offset of the conversion function for a low temperature optical power in the range of −33 dBm~−25 dBm in the second channel; ADC2_25 represents the optical power value of the second channel as the input optical power reaches −25 dBm at an ambient temperature of 25 degrees centigrade, ADC2_25L represents the optical power value of the second channel as the input optical power reaches −25 dBm at an ambient temperature of 0 degree centigrade, temp N represents the normal temperature, and temp L represents the low temperature.

In an even further example, in the case where the optical power value at a given temperature is the optical power value of the second channel and the current temperature is less than the threshold temperature, if the optical power value at a given temperature is greater than ADC2_25+(ADC2_25L−ADC2_25)*(the current temperature−temp N)/(temp L-temp N), then slope=slope2_25~15L and offset=offset2_25~15L, where slope2-25~15L and offset2-25~15L are the slope and offset of the conversion function for a low temperature optical power in the range of −25 dBm~−15 dBm in the second channel, ADC2_25 represents the optical power value of the second channel as the input optical power reaches −25 dBm at an ambient temperature of 25 degrees centigrade, ADC2_25L represents the optical power value of the second channel as the input optical power reaches −25 dBm at an ambient temperature of 0 degree centigrade, temp N represents the normal temperature, and temp L represents the low temperature.

In a still further example, in the case where the optical power value at a given temperature is the optical power value of the second channel and the current temperature is less than the threshold temperature, if the optical power value at a given temperature is greater than ADC2_25+(ADC2_25L−ADC2_25)*(the current temperature−temp N)/(temp L−temp N), then slope=slope2_33~25L and offset=offset2_33~25L, where slope2-33~25L and offset2-33~25L are the slope and offset of the conversion function for a high temperature optical power in the range of −33 dBm~−25 dBm in the second channel, ADC2_25 represents the optical power value of the second channel as the input optical power reaches −25 dBm at an ambient temperature of 25 degrees centigrade, and ADC2_25L represents the optical power value of the second channel as the input optical power reaches −25 dBm at an ambient temperature of 70 degrees centigrade, temp N represents the normal temperature, and temp L represents the low temperature.

In yet another example, in the case where the optical power value at a given temperature is the optical power value of the second channel and the current temperature is less than the threshold temperature, if the optical power value at a given temperature is greater than ADC2_25+(ADC2_25H−ADC2_25)*(the current temperature−temp N)/(temp L−temp N), then slope=slope2_25~15H, and offset=offset2_25~15H, where slope2-25~15H and offset2-25~15H are the slope and offset of the conversion function for a high temperature optical power in the range of −15 dBm~−25 dBm in the second channel, ADC2_25 represents the optical power value of the second channel as the input optical power reaches −25 dBm at an ambient temperature of 25 degrees centigrade, ADC2_25H represents the optical power value of the second channel as the input optical power reaches −25 dBm at an ambient temperature of 70 degrees centigrade, temp N represents the normal temperature, and temp L represents the low temperature.

In another example, in the case where the optical power value at a given temperature is the optical power value of the first channel and the current temperature is greater than the threshold temperature, if the optical power value at a given temperature is greater than ADC1_15+(ADC1_15H−ADC1_15)*(the current temperature−temp N)/(temp L−temp N), then slope=slope1_15~5H and offset=offset1_15~5H, where slope1-15~5H and offset1-15~5H are the slope and offset of the conversion function for a high temperature optical power in the range of −1 dBm~−15 dBm in the first channel, ADC1_15 represents the optical power value of the first channel as the input optical power reaches −15 dBm at an ambient temperature of 25 degrees centigrade, ADC1_15H represents the optical power value of the first channel as the input optical power reaches −15 dBm at an ambient temperature of 70 degrees centigrade, temp N represents the normal temperature, and temp L represents the low temperature.

In yet another example, in the case where the optical power value at a given temperature is the optical power value of the first channel and the current temperature is greater than tempgate, if the optical power value at a given temperature is greater than ADC1_15+(ADC1_15H−ADC1_15)*(the current temperature−temp N)/(temp L−temp N), then slope=slope1_25~15H and offset=offset1_25~15H, where slope1-25~15H and offset1-25~15H are the slope and offset of the conversion function for a high temperature optical power in the range of −15 dBm~−25 dBm in the first channel, ADC1_15 represents the optical power value of the first channel as the input optical power reaches −15 dBm at an ambient temperature of 25 degrees centigrade, ADC1_15H represents the optical power value of the first channel as the input optical power reaches −15 dBm at an ambient temperature of 70 degrees centigrade, temp N represents the normal temperature, and temp L represents the low temperature. The final optical power value(s) at standard temperature in the low temperature function may be the optical power value at a given temperature minus (the optical power value at a given temperature*slope+offset)*(the current temperature−tempN)/(tempL−tempN), and the final optical power value(s) at standard temperature in the high temperature function may be the optical power value at a given temperature−(the optical power value at a given temperature*slope+offset)*(the current temperature−tempN)/(tempH−tempN).

According to embodiments of the present invention, the slope and offset of the conversion function for a high temperature optical power can be determined by collecting true values (e.g., ADC_calibration_H) of channels relative to light beams having different rates of power from an optical source in a hot environment, and then subtract the optical power values of identical optical powers at standard temperature from the collected high temperature true values to obtain high temperature relative differences (e.g., ADC_delta_H), and calculating the slope and offset of each linear function using the collected high temperature true values and the high temperature relative differences (e.g., ADC_delta_H) between adjacent points. For example, the slope and offset of the conversion function for a low temperature optical power can be determined by collecting true values (e.g., ADC_calibration_L) of channels relative to light beams having different rates of power from an optical source in a cold environment, and then subtract the optical power values of identical optical powers at standard temperature from the collected low temperature true values to obtain low temperature relative differences (e.g., ADC_delta_L), and calculating the slope and offset of each linear function using the low temperature true values (e.g., ADC_calibration_L) and low temperature relative differences (e.g., ADC_delta_L) between adjacent points. In various embodiments, the power threshold at standard temperature (e.g., Tpower) may be −25 dBm at 25 degrees centigrade. The power threshold at standard temperature may be less than the saturated power of channels having a high gain by a certain or predetermined amount. In general, the power threshold at standard temperature may be at least 10 dB less than the saturated power of channels having high gain.

According to further embodiments of the present invention, the standard power function may be obtained by valuing light beams having different rates of power from an optical source at standard temperature at regular intervals and (optionally) in a proper order, and then collecting and selecting the optical power value of the first or second channel, obtaining relative piecewise power functions from the power values powerN1 and PowerN2 of every two adjacent points and the optical power values (e.g., ADCN1 and DACN2) thereof.

These piecewise power functions form a standard power function. According to the present invention, the final optical power value(s) at standard temperature enable one to utilize the relative piecewise power functions to calculate optical power. In certain embodiments, the high temperature may be 70 degrees centigrade, and the low temperature may be 0 degrees centigrade.

Relative to existing technologies, the present invention advantageously provides algorithms, micro programming systems, and circuits for monitoring an optical receiver (e.g., of a DDMI transceiver) and a method for monitoring a burst mode optical power thereof that realizes monitoring precision compensation for burst mode optical power in a commercial temperature range (0° C.-70° C.), and that can also be applied to high precision digital monitoring of optical transceivers (e.g., optical line terminals [OLTs] in a passive optical network [PON]) in the commercial temperature range with error value of as small as +/−1 dB. The circuit for monitoring the optical receiver and the method for monitoring burst mode optical power thereof in accordance with the present invention enables optical power monitoring in a wide range (−6 dBm~−30 dBm) without impact on optical signal reception sensitivity. The circuit for monitoring the optical receiver and the method for monitoring burst mode optical power thereof in accordance with the present invention can effectively monitor burst mode optical signals with a duration greater than 1 μs and ensure the accuracy and range of monitoring. The circuit for monitoring the optical receiver and the method for monitoring burst mode optical power thereof in accordance with the present invention can be implemented in a simple manner.

By utilizing a plurality of temperature functions selected based on a measure temperature, and comparing the sampled digital values with one or more of a plurality of equations, an optical power value can be more accurately determined in comparison to those of conventional optical transceivers. These and other advantages of the present invention will become readily apparent from the detailed description of various embodiments below.

BRIEF DESCRIPTION OF THE DRAWINGS

Identification numbers in the figures include the following: 1—APD, 2—current mirror, 3—first transresistance amplifier, 4—second transresistance amplifier, 5—first sampling retaining circuit, 6—second sampling retaining circuit, 7—first voltage follower, 8—second voltage follower, 9—microprocessor, 10—boosted circuit, 20—step 20, 31—step 31, 32—step 32, 41—step 41, 42—step 42, 43—step 43, 44—step 44, 51—step 51, 52—step 52, 53—step 53, 54—step 54, 55—step 55, 56—step 56.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the disclosure.

The invention, in its various aspects, will be explained in greater detail below with regard to exemplary embodiments.

Figure 1:
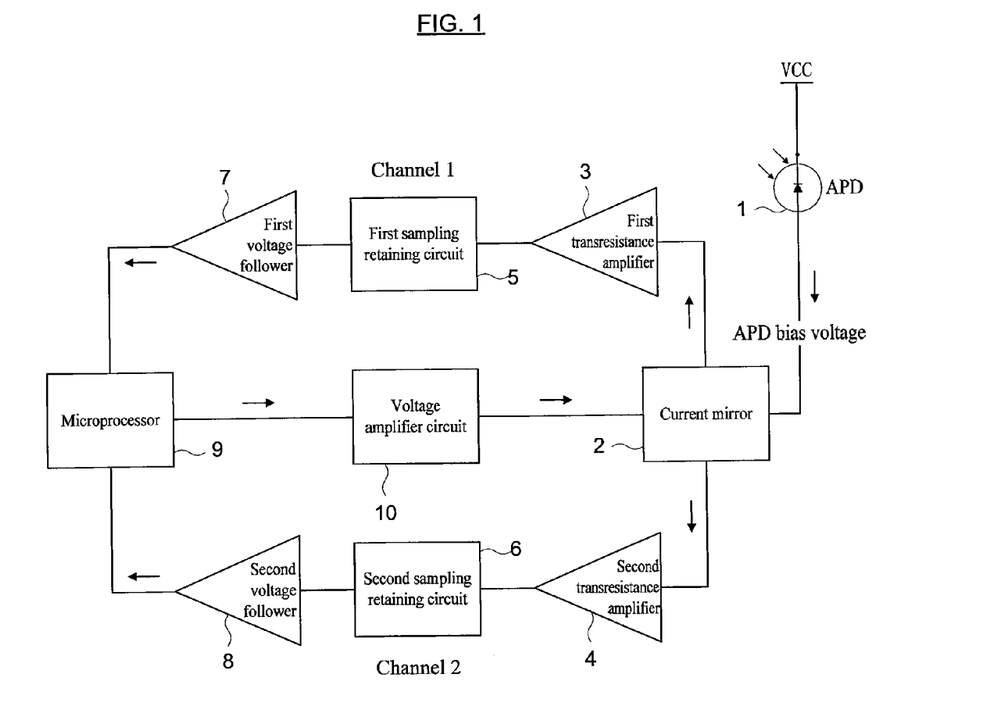
FIG. 1 a functional block diagram of an optical transceiver in accordance with the present invention.

A circuit for monitoring an optical receiver (e.g., in a DDMI optical transceiver) is shown in FIG. 1. As shown, the circuit comprises an avalanche photodiode APD 1 the cathode of which is connected to a power supply, a microprocessor 9, a first transresistance amplifier 3 and a second transresistance amplifier 4. The microprocessor 9 comprises a first ADC port, a second ADC port and a DAC port. The current mirror 2 is configured to connect to the anode of APD 1, the first transresistance amplifier 3, and the second transresistance amplifier 4 respectively. The microprocessor 9 may be a single-chip microprocessor or, for example, a microcontroller, field programmable gate array (FPGA), application-specific integrated circuit (ASIC), or complex programmable logic device (CPLD), configured to control and/or adjust various functions of the circuit for monitoring an optical receiver. The circuit further comprises a first sampling retaining circuit 5, a voltage amplifier circuit 10, a second sampling retaining circuit 6, a first voltage follower 7, and a second voltage follower 8.

The first and second transresistance amplifiers 3 and 4 may each comprise any amplifier configured to receive a current and provide a voltage, and in one example, can be a low gain amplifier. First transresistance amplifier 3 and second transresistance amplifier 4 are electrically connected to and configured to receive a current from current mirror 2. The first and second sampling retaining circuits can include a memory, such as a latch, flip-flop or register (or other suitable type of RAM or volatile storage element, such as static random-access memory [SRAM], dynamic RAM [DRAM], etc.) that maintains a stored state when power is applied and that can be rewritten without application of special voltages or use of special procedures (e.g., conventional non-volatile memory write and/or erase procedures).

Voltage amplifier circuit 10 can be any amplifier capable of receiving a signal selectively provided by the microprocessor 9 and providing an amplified voltage signal to current mirror 2. First voltage follower 7 and second voltage follower 8 are configured to increase a voltage or current of the signal received from their respective sampling retaining circuits.

The microprocessor 9 is electrically connected to the voltage amplifier circuit 10 via the DAC port. The voltage amplifier 10 is electrically connected to current mirror 2. The first transresistance amplifier 3 may be connected to the first voltage follower 7 via the first sampling retaining circuit 5. The microprocessor 9 can also be connected to the first voltage follower 7 via the first ADC port. A first channel ("channel 1") comprises first transresistance amplifier 3, first sampling retaining circuit 5, first voltage follower 7, and the first ADC port (e.g., "port 1") of microprocessor 9. The second transresistance amplifier 4 may be connected to second voltage follower 8 via the second sampling retaining circuit 6. The microprocessor 9 may be connected to the second voltage follower 8 via the second ADC port (e.g., "port 2"). A second channel ("channel 2") comprises second transresistance amplifier 4, second sampling retaining circuit 6, second voltage follower 8, and the second ADC port of microprocessor 9.

Channel 1 and channel 2 are independent of each other and provide different gains. One of the channels is configured to monitor an overload power, and the other channel is configured to monitor a sensitivity power. The microprocessor 9 can select a proper channel to monitor optical power based on various requirements (e.g., predetermined receiver power requirements), so as to expand the optical power monitoring range of circuits for monitoring the receiver of an optical transceiver.

The microprocessor 9 outputs an analog voltage via the DAC port to voltage amplifier 10. The amplified voltage can be supplied to the current mirror 2, which in turn produces one or more currents using the amplified voltage and/or a bias voltage from the APD 1. A photocurrent produced by APD 1 can be converted into a first current and a second current having different strengths by current mirror 2. A first current can be provided to first transresistance amplifier 3 in channel 1 and converted into a first voltage. After being sampled by first sampling retaining circuit 5, the first voltage can be supplied to first voltage follower 7 and supplied to a first ADC port of the microprocessor 9. Microprocessor 9 can then determine a digital or ADC optical power value of the first channel. Similarly, a second current can be provided from the current mirror 2 to the second transresistance amplifier 4 in the second channel and converted into a second voltage. The second voltage can be supplied to second voltage follower 8 after being sampled by a second sampling retaining circuit 6, and subsequently supplied to a second ADC port of microprocessor 9. Microprocessor 9 can then determine an ADC value of the second channel. In one example, current mirror 2 is a multipath constant flow source.

In theory, when the optical receiver maintains a stable operating temperature, the APD bias voltage also remains stable, and in turn, the gain of the APD remains stable. As a result, light beams of the same strength received by the APD are converted into currents that have the same strength. The current generated by the received light beams is provided to the first and second transresistance amplifiers 3 and 4, first and second sampling circuits 5 and 6, and first and second voltage followers 7 and 8. The current is subsequently converted into a voltage that is supplied to the ADC port of the microprocessor 9, which then determines an ADC (e.g., digital) value of the received voltage. The strength of the received optical power (e.g., of the light beam) can be determined using the digital optical power value generated by microprocessor 9.

However, if the optical power of light beams having different strengths is to be determined, all ADC values relative to the different optical powers must be captured, which is generally impractical and perhaps unnecessarily time-consuming. However, one or more mathematical formulas can be utilized to simulate allocation of the received optical power and relative ADC values within coordinate axes.

In one exemplary embodiment, an optical network unit (ONU) optical source (e.g., an optical transmitter) is used to emit light beams of various strengths in a range between −33 dBm and −5 dBm. The ONU optical source is also used to emit light beams having different optical power values at intervals of 1 dBm in a range between −31 dBm and −27 dBm. Additionally, the ONU optical source is used to emit light beams having different optical power values at 2 dBm intervals. For example, evaluation points having different values, such as −33, −31, −30, −29, −28, −27, −25, −23, −21, −19, −17, −15, −13, −11, −9, −7 and −5 dBm can be used, and relative and/or corresponding ADC values can be determined. Test results showing analog optical power values relative to optical power values determined by an ADC are shown in FIGS. 2 and 3.

Figure 2:
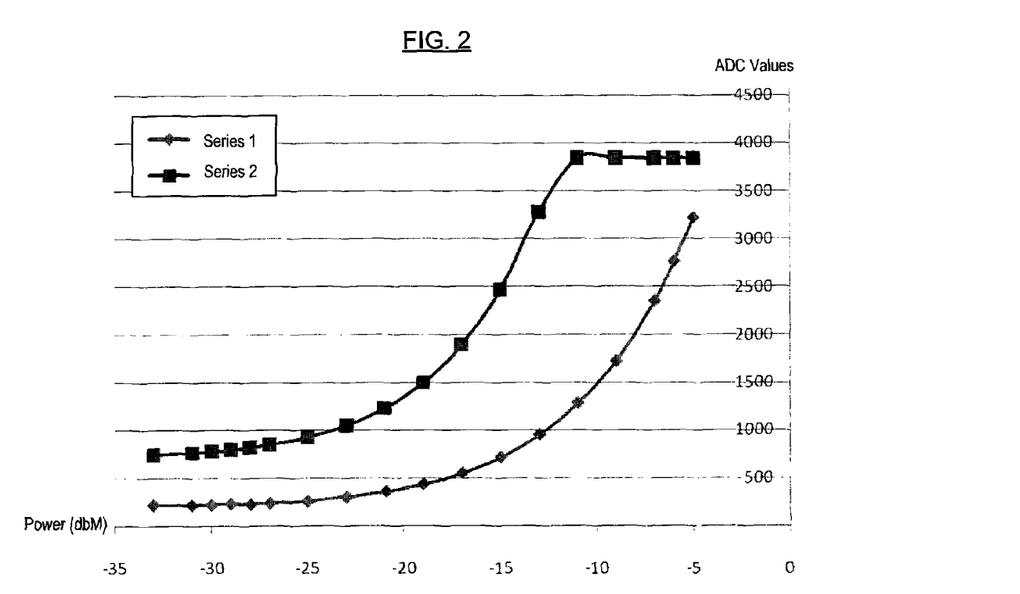
FIG. 2 is an allocation diagram showing optical power values (dBm) relative to digital optical power values obtained using an ADC.

FIG. 2 is an exemplary diagram showing optical power values (measured in dBm) relative to ADC values, in which the optical power values are plotted on a horizontal axis and the ADC values are plotted on a vertical axis. The first curve, series 1, shows ADC values of a first channel (channel 1), which has a low gain. The second curve, series 2, shows ADC values of a second channel (channel 2), which has a high gain (or a gain substantially greater than the first gain).

Figure 3:
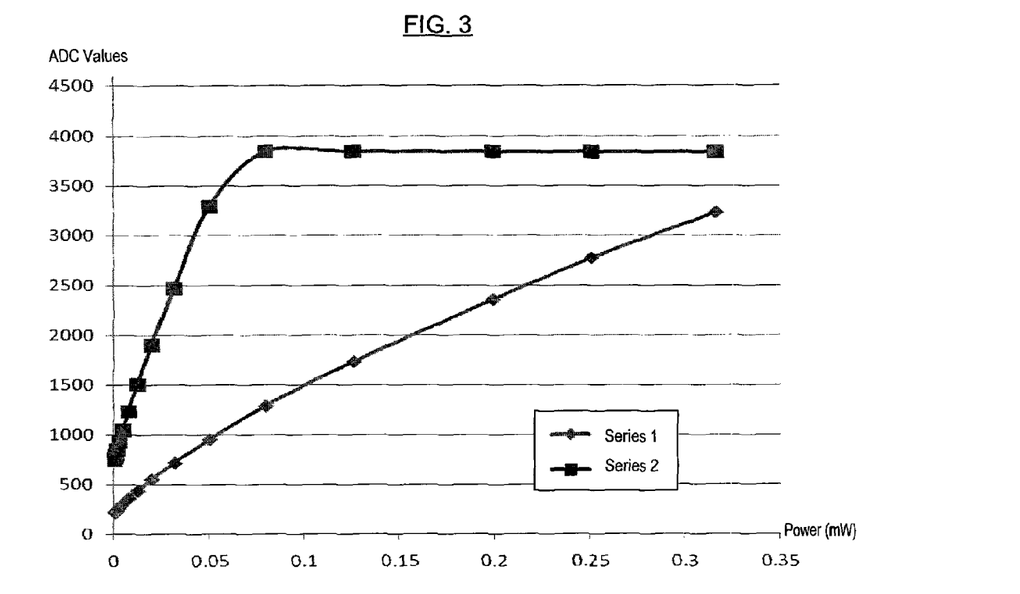
FIG. 3 is an exemplary diagram showing optical power values (in mW) relative to digital optical power values obtained using an ADC.

FIG. 3 is an exemplary diagram showing optical power values (measured in mW) relative to ADC values, in which analog optical power values are plotted on a horizontal axis, and digital optical power values or ADC sampled values are plotted on a vertical axis. A first curve, series 1, shows ADC values of channel 1, which has a low gain, and series 2 shows ADC values of channel 2, which has a high gain.

As can be seen in FIG. 2, series 1 and series 2 are each similar to an exponential function, with optical power (measured in dBm) plotted on the horizontal axis. Also, as shown in FIG. 3, series 1 and 2 are similar to a linear function, with optical power (measured in mW) plotted on the horizontal axis. However, series 2 becomes saturated due to the optical receiver becoming saturated by the increased optical power as the gain increases.

Exponential functions can be challenging to implement in firmware because the exponential functions may magnify any inaccuracies in the data. On the contrary, linear functions can be easily implemented in firmware with relatively high accuracy. As shown in FIG. 3, series 1 and 2 are curves. In the present invention, the curves are subdivided so that the lines between every two points are similar to a straight line. Utilizing the straight lines, function formulas and/or standard functions for different sections based on each of the lines between every pair of two adjacent points can be inferred. In alternative embodiments, more than two adjacent points can be used to define the function formulas and/or standard functions, and/or two or more function formulas and/or standard functions can be created between two adjacent points if the curve between the points can be modeled or estimated with some accuracy. ADC values of different sections correspond to different standard functions/formulas.

When ADC (e.g., digital) values are obtained, the ADC value from the first channel (e.g., channel 1) or the second channel (e.g., channel 2) is selected based on the actual operating condition(s), the corresponding function formula and/or standard function can then be determined, and the received optical power can be calculated using the selected ADC function.

As shown in FIGS. 2 and 3, saturation happens in channel 2 due to the high gain when a high optical power is received. The error may be great if channel 2 is selected to determine the optical power. Thus, it is proper to select the ADC of channel 1 having a low gain to detect power. When the power is low, usage of channel 2 to detect optical power provides a high sensitivity since channel 2 has a high gain. Therefore, two channels, high-gain channel 2 and low-gain channel 1, are employed in the present invention. When low power is received, channel 2 can be employed to increase detection sensitivity. When the power is great enough that high-gain channel 2 becomes saturated, low-gain channel 1 can be employed for determination. Cooperation of the two channels can increase precision of power detection. With regard to channels with different gains, once the gains are determined, a power Tpower can be selected as a threshold power. Low-gain channel 1 can be used when the power at the receiver is greater than power threshold Tpower, and high-gain channel 2 can be employed for power detection when the power at the receiver is less than threshold Tpower.

Generally, the power threshold Tpower is less than that of the saturated power of a high-gain channel by a certain amount, which means the power threshold Tpower should have a certain gap with the saturated power of the high-gain channel. In general, the power threshold Tpower is less than the saturated power of the high-gain channel by about 10 dB.

As shown in FIG. 2, saturation appears in channel 2 as the received power stays between −15 dBm and −10 dBm. In the embodiment of FIG. 2, power threshold Tpower can be equal to −25 dBm. Thus, if the received power is less than −25 dBm, the ADC of channel 2 can be employed. Furthermore, if the received power is greater than −25 dBm, the ADC of channel 1 can be employed. This method is utilized to determine ADC for power detections illustrated below.

Figure 4:
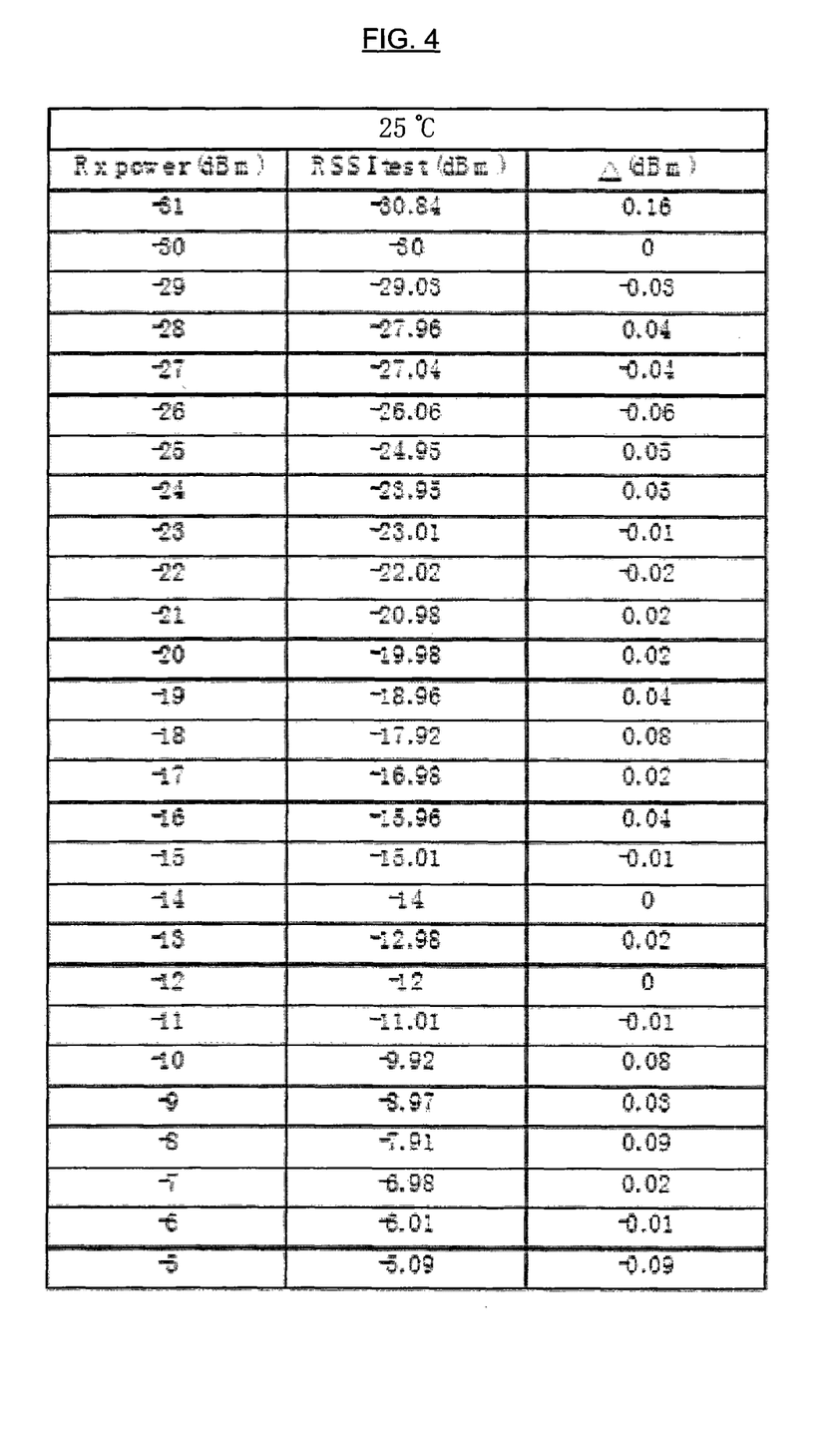
FIG. 4 is a table showing normal temperature corrections for an optical receiver after testing.

At an ambient temperature of 25° C., an ONU optical source is utilized to emit light beams having different optical powers at intervals of 1 dBm in a range between −33 dBm and −5 dBm, and to emit light beams having different optical powers at intervals of 2 dBm in another range, namely, at evaluation points having different values including −33, −31, −30, −29, −28, −27, −25, −23, −21, −19, −17, −15, −13, −11, −9, −7 and −5 dBm. These data can be used to determine relative ADCs (e.g., digital values). In the range between −33 dBm and −5 dBm, a graph of ADC2 relative to channel 2 can be obtained. In the range between −25 dBm and −5 dBm, a graph of ADC1 relative to channel 1 can be obtained. Relative piecewise power functions can be obtained via the power values PowerN1 and PowerN2 of every two adjacent points and the ADC values ADCN1 and ADCN2 thereof, and these piecewise power functions can form standard power functions (e.g., various ADC piecewise standard functions at standard temperature). When a circuit for monitoring the optical receiver is in operation, the circuit can determine in which ADC interval the ADC values are located based on captured ADC values (utilizing the above-mentioned method, ADC values of channel 1 or channel 2 are employed according to the actual values received), and then determine a relative power using standard piecewise functions of the interval to create a lookup table for the ADC values at standard temperature and the relative piecewise standard functions. In order to verify the accuracy of the piecewise standard functions, ADC values at different powers must be tested, and then subsequently received optical power values can be calculated using the relative piecewise standard functions. The test results shown in FIG. 4 were obtained by comparing calculated optical power values with actual optical power values. The highly precise data in FIG. 4 illustrates the accuracy of simulating received optical power using the multiple standard piecewise functions.

Specifically, when the above-mentioned piecewise functions are utilized, a standard temperature of 25° C. is employed for one embodiment. However, in various environments, different temperatures can be employed to calculate various standard piecewise functions, but normal (or standard operating) temperature is ideal, and no adjustment in ambient temperature is required.

In the present invention, piecewise standard functions can be further utilized to test optical powers at low temperature (e.g., 0° C.) or high temperature (e.g., 70° C.). The method for testing optical powers at low temperatures includes (i) cooling the temperature down to 0° C., and providing a light beam at a first power (e.g., −33 dBm) from an ONU optical source, (ii) modulating an APD bias voltage until the received optical power reaches −33 dBm, and selecting ADC values of a relative channel (e.g., the first or second channel) using a microprocessor (e.g., microprocessor 1) based on the received power, and (iii) subsequently plugging the ADC values into the piecewise standard functions to determine or provide the relative optical powers. In the same way, optical powers relative to various light beams received in a range between −33 dBm and −5 dBm at intervals of 1 dB can be detected to collect received optical power data for creating a graph and the standard piecewise functions.

Similarly, at a temperature of about 70° C., utilizing the method discussed above with respect to low temperatures, an ONU optical source can transmit various light beams in a range between −33 dBm and −5 dBm at intervals of 1 dB, and optical powers relative to ADCs at various reference points can be determined. Test results at the low and high temperatures are shown in FIG. 5.

Figure 5:
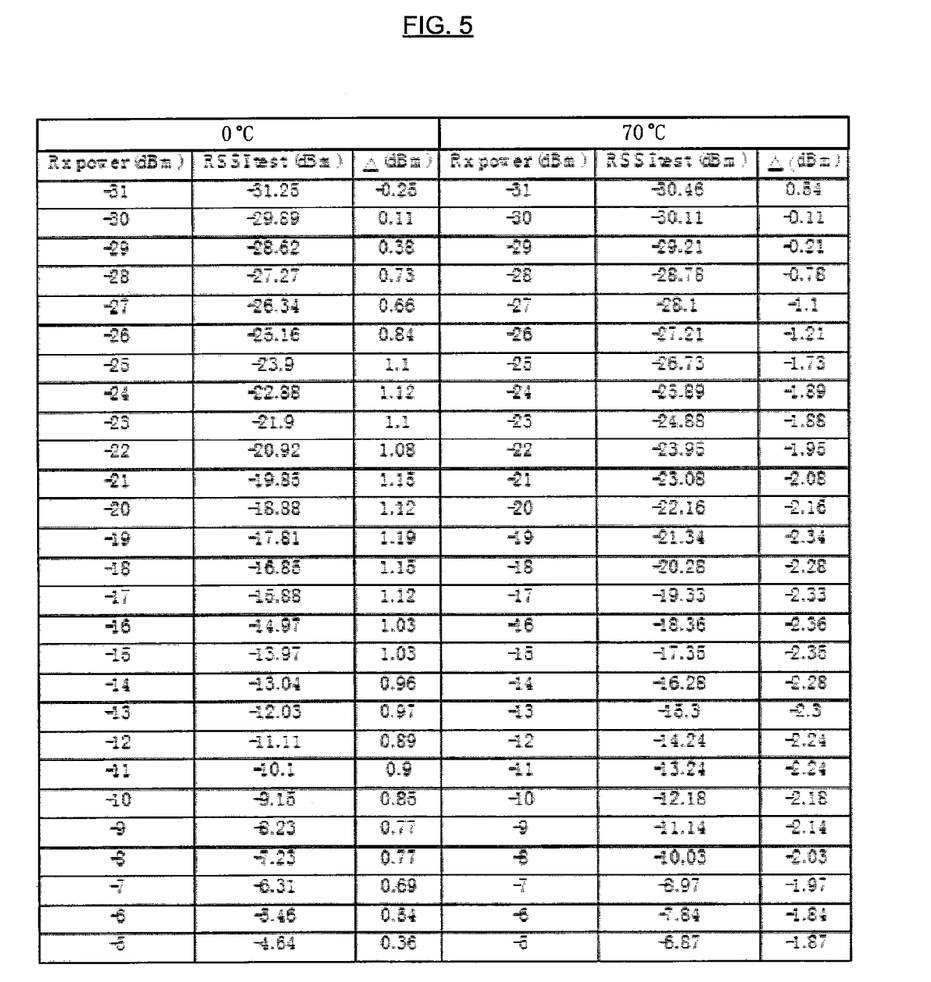
FIG. 5 is a table showing results of optical power receiving tests at 0° C. and 70° C.

As shown in FIG. 5, the data is relatively inaccurate, due to the bias voltage and gain of the APD changing when the operating temperature changes. Thus, light beams of the same strength are received, but the current converted by the APD varies as the temperature varies. The varying current results in errors that are too great to be utilized with the same piecewise function (e.g., as that generated at ambient temperature).

When real-time monitoring occurs at various temperatures, if the obtained ADC values (e.g., the ADC values of channel 1 or 2) are plugged into the standard piecewise functions, the calculated optical powers will be inaccurate. In order to avoid this inaccuracy, each of the optical powers at various temperatures are compensated. In the present invention, accurate optical powers are obtained by plugging or substituting a final ADC value (ADC_final) at a standard operating temperature as converted from the obtained ADC values (e.g., the ADC values of channel 1 or 2).

Figure 6:
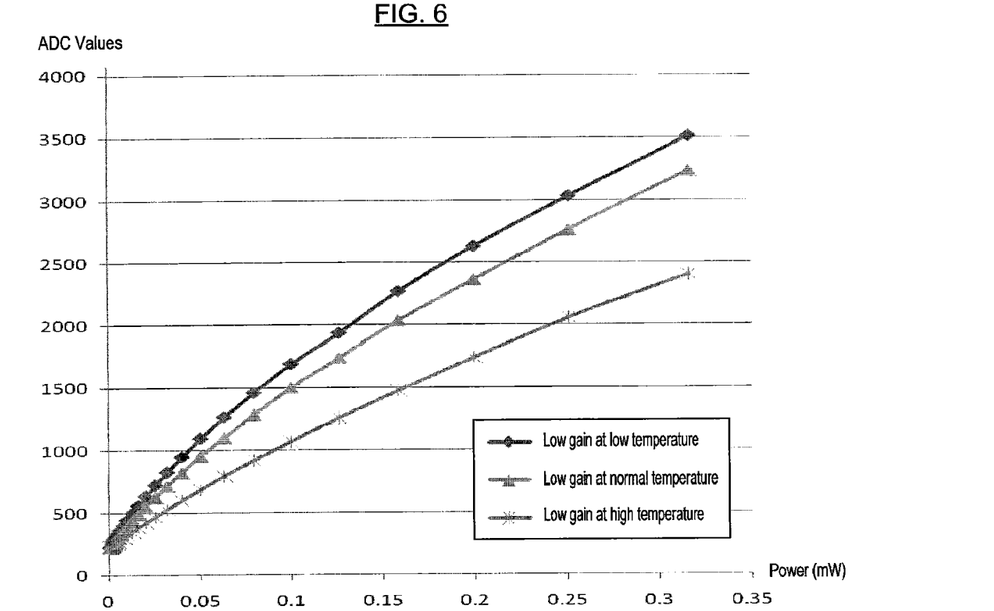
FIGS. 6 and 7 are graphs showing low gain and high gain embodiments, respectively, with optical power (mW) at normal, low, and high temperatures relative to digital optical power values.
Figure 7:
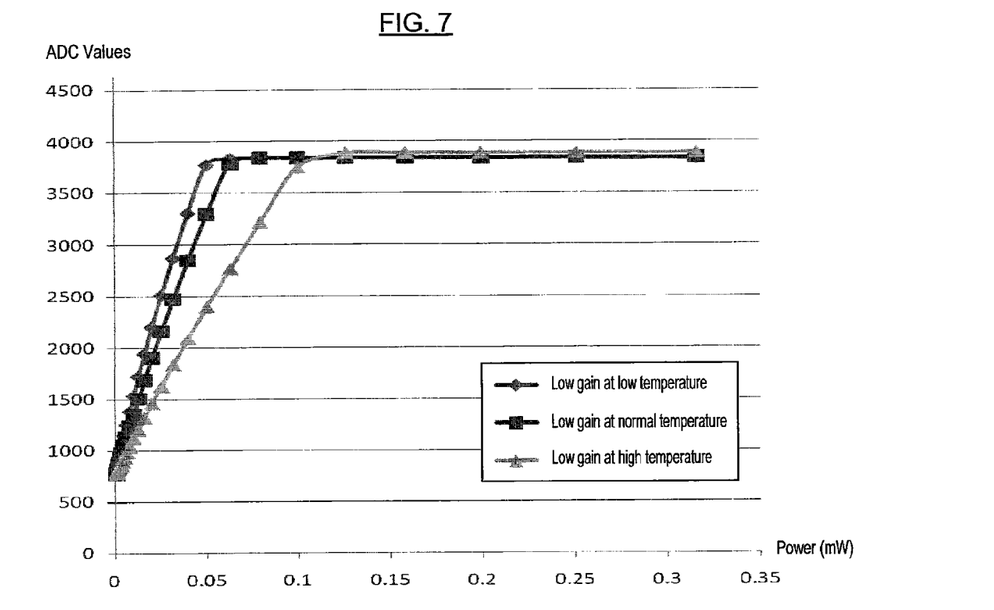

FIGS. 6 and 7 are exemplary diagrams showing optical power values obtained from both high and low gain channels (e.g., channels 1 and 2) at a normal or standard operating temperature (25° C.), a low temperature (0° C.) and a high temperature (70° C.) in dBm relative to the ADC values. As shown in FIG. 7 (low gain) and FIG. 6 (high gain), optical power is plotted on the horizontal axis in mW and ADC values are plotted on the vertical axis. The three allocation lines in FIG. 6 are approximately linear. Also, the three allocation lines in FIG. 7 are approximately linear, except during saturation. The difference between the ADC values at the first temperature and relative ADC values at the second temperature may be a linear function of the ADC. If the second temperature is a standard operating temperature (e.g., ambient temperature, or temperature of about 25° C.), differences between the ADC values obtained at non-standard operating temperatures and ADC values obtained at the standard operating temperature also could be linear functions. Therefore, ADC values detected at any temperature can be converted into a final ADC value (e.g., an ADC_final value) at standard temperature, and the ADC_final value can be plugged into a piecewise standard function to determine a relative optical power.

More specifically, in one embodiment, when the first channel (e.g., channel 1) or the second channel (e.g., channel 2) is selected, when the received optical power is within a first, relatively low range (e.g., between −33 dBm and −25 dBm), the ADC of the second channel (channel 2) will be selected. Similarly, when the received optical power is within a second, relatively high range (e.g., between −25 dBm and −5 dBm), the ADC of the first channel (e.g., channel 1) will be selected.

A high temperature embodiment is now described for illustration. In an exemplary high temperature (e.g., 70° C.) embodiment, firstly, an initial input optical power of −33 dBm is provided after the APD bias voltage is adjusted. An optical source (e.g., an optical transmitter) is subsequently enabled, and the ADC value of channel 2 is loaded into a register (e.g., of or associated with microprocessor 9 in FIG. 1). The ADC__33 value (the ADC value of channel 2 when the optical power reaches −33 dBm at normal temperature) is subtracted to obtain a difference at −33 dBm (e.g., a D-value ADC_delta__33_H). Alternatively or additionally, when a light beam having an input optical power of −25 dBm is provided, and the optical source subsequently enabled, the ADC value of channel 2 is loaded in a register and the ADC__25 value (the ADC value when the optical power reaches −25 dBm at normal temperature) is subtracted to obtain a difference at −25 dBm (e.g., a D-value ADC_delta__25_H).

Furthermore, when an input optical power of −15 dBm is received and the optical source (e.g., an optical transmitter) is activated, the ADC value of channel 1 is loaded and the ADC__15 value (when the optical power in channel 1 reaches −15 dBm at normal temperature) is subtracted to obtain a difference at −15 dBm (e.g., a D-value ADC_delta__15_H). In addition, when an input optical power of −5 dBm is provided and the optical source is activated, the ADC value of channel 1 is loaded into a register and the ADC__5 value (when the optical power in channel 1 reaches −5 dBm at normal temperature) is subtracted to obtain a difference at −15 dBm (e.g., a D-value ADC_delta__5_H).

These values can be utilized to develop a linear function of ADC values and D-values ADC_delta at high temperature. The linear function can be utilized to determine the slope and offset for each piecewise standard function at high temperature in the range of −33 dBm to about −25 dBm (offset2_33~25H, slope2_33~25H), the slopes and offsets for each piecewise standard function at high temperature in a range of −25 dBm to about −15 dBm (slope1_25~15H, offset1_25~15H), and the slopes and offsets for each piecewise standard function at high temperature in a range of −15 dBm to about −5 dBm (slope1_15~5H, offset1_15~5H). The slopes and offsets of the linear functions of ADC values and D-values ADC_delta at high temperature may be stored in a register (e.g., a register in microprocessor 9).

A linear function of ADC values and difference values (e.g., D-values ADC_delta) at low temperature can also be determined using the above method. In a low temperature (e.g., 0° C.) embodiment, a light beam having an optical power of about −33 dBm is received and after the APD bias voltage is adjusted, an optical source (e.g., an optical transmitter) is enabled. The ADC value of channel 2 is then loaded in a register and the ADC__33 value (the ADC value of channel 2 when the optical power reaches −33 dBm at a normal operating temperature) is subtracted to determine a difference at −33 dBm (e.g., a D-value ADC_delta__33_L). Alternatively or additionally, when an input optical power of 25 dBm is provided and the optical source is enabled, the ADC value of channel 2 is loaded in a register and the ADC__25 value (the ADC value of channel 2 when the optical power reaches −25 dBm at the normal operating temperature) is subtracted to obtain a difference at −25 dBm (e.g., a D-value ADC_delta__25_L). Furthermore, when an input optical power of −15 dBm is provided, and the optical source is subsequently enabled, the ADC value of channel 1 is loaded in a register and the ADC__15 value (the ADC value of channel 1 when the optical power reaches −15 dBm at normal temperature) is subtracted to obtain a difference at −15 dBm (e.g., a D-value ADC_delta__15_L). Additionally, when an input optical power of −5 dBm is provided and the optical source is enabled, the ADC value of channel 1 is loaded in a register and the ADC__5 value (the ADC value of channel 1 when the optical power reaches −5 dBm at normal operating temperature) is subtracted to determine a difference at −5 dBm (e.g., a D-value ADC_delta__5_L).

These values can be utilized to develop a linear function of ADC values and difference values (e.g., D-values ADC_delta) at low temperature. The linear function can be utilized to determine the slope and offset for each piecewise standard function, including the slopes and offsets of linear functions at low temperature in the range of −33 dBm to about −25 dBm (offset2_33~25L, slope2_33~25L), the slopes and offsets of linear functions at low temperature in the range of −25 dBm~−15 dBm (slope1_25~15L, offset1_25~15L), and the slopes and offsets of linear functions at low temperature in the range of −15 dBm to about −5 dBm (slope1_15~5L, offset1_15~5L). Additionally, the slopes and offsets of the linear functions of ADC values and D-values ADC_delta at low temperatures may be stored in a register (e.g., a register in microprocessor 9).

By utilizing above-described method, a reduction formula at high or low temperature can be developed. That is, ADC values obtained at high or low temperatures can be equated into ADC values of normal operating temperatures using formula (1) shown below, wherein:

$$\text{ADC\_comp} = \text{ADC} - (\text{ADC} * \text{slope} + \text{offset}) \quad (1)$$

Additionally, referring to formula (2) below:

$$\text{ADC\_final} = \text{ADC} - (\text{ADC} * \text{slope} + \text{offset}) * (\text{temp} - \text{temp}N)/(\text{temp}H/L - \text{temp}N) \quad (2)$$

ADC represents an ADC value at high or low temperature, ADC_comp represents an ADC value at normal operating temperature converted from the ADC at high or low temperature, slope represents the slope of the reduction formula at high or low temperature (e.g., 70° C. or 0° C.), and offset represents the offset of the reduction formula at high or low temperature (e.g., 70° C. or 0° C.). However, as the temperature fluctuates, the number of reduction formulas of all of the temperatures increases, and memory limits may make it impractical to maintain all of the parameters of the reduction formulas. In the present invention, this problem can be overcome by utilizing temperature coefficient compensation. As the temperature fluctuates, the APD gain changes in a linear fashion with the temperature, so the temperature coefficient can be introduced into the formula such that formula (2) is capable of converting an ADC value at any temperature into an ADC_final value at normal operating temperature.

That is, referring to formula (2) above, ADC may represent an ADC truth-value obtained at any temperature (e.g., the ADC actual value of channel 1 or channel 2 based on a received optical power), ADC_final may represent a standard value of ADC_comp plus a temperature coefficient, slope represents the slope of the reduction formula at a high or low temperature (e.g., 70° C. or 0° C.), and offset represents the offset of the reduction formula at the high or low temperature (70° C. or 0° C.). Thus, the low temperature equation may be represented by:

ADC_final=ADC−(ADC*slope$L$+offset$L$)*(temp−temp$N$)/(temp$L$−temp$N$)

and the high temperature equation may be represented by:

ADC_final=ADC−(ADC*slope$H$+offset$H$)*(temp−temp$N$)/(temp$H$−temp$N$)

where slopeL and offsetL represent the relative slope and offset at low temperatures, and slopeH and offsetH represent the relative slope and offset at high temperatures. Thus, when the circuit is used to provide real time monitoring, a standard value ADC_final can be plugged into the piecewise standard function relative to the ADC_final value obtained at normal operating temperature conditions to calculate a received optical power.

Figure 8:
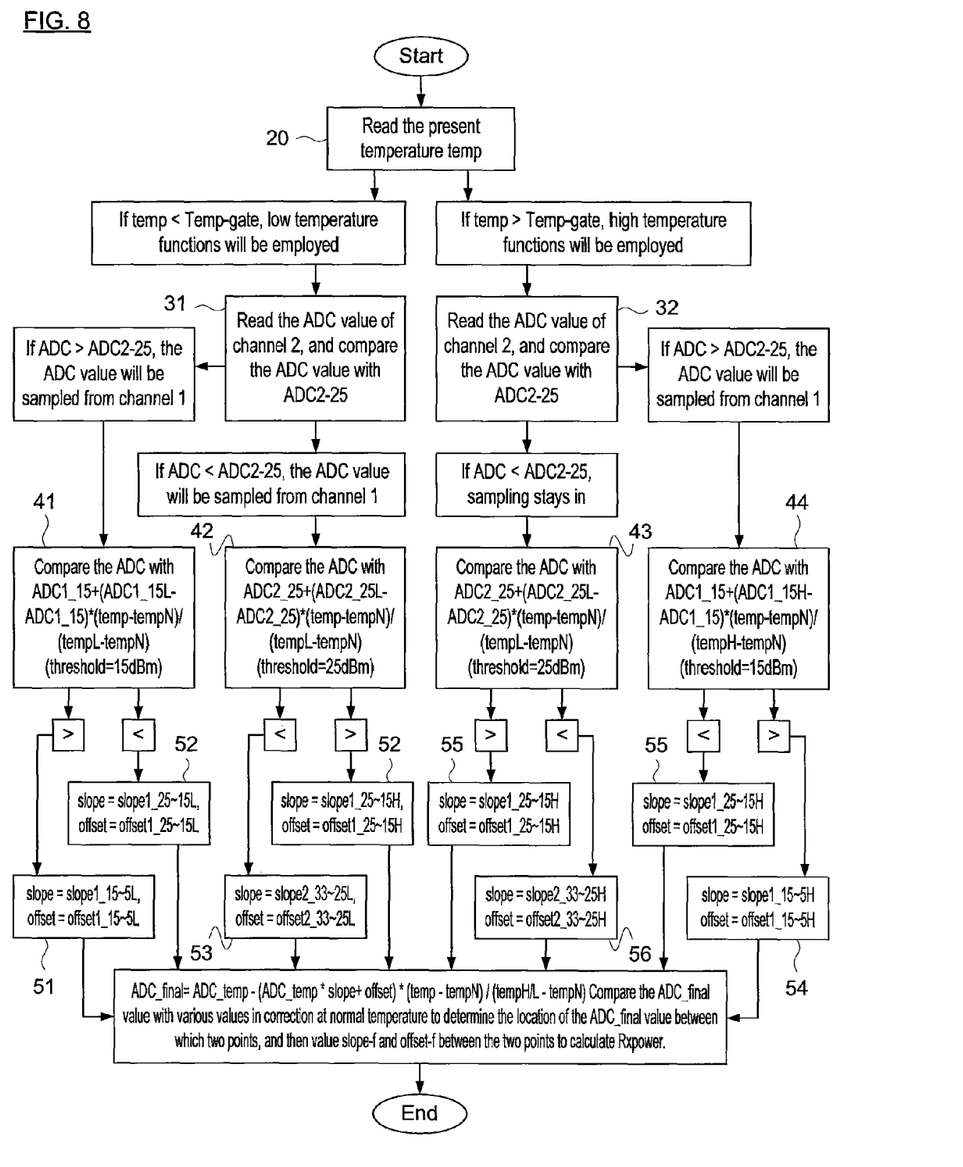
FIG. 8 is a flow chart showing steps of determining a final digital optical power value and calculating a received optical power value.

FIG. 8 shows an exemplary embodiment providing a flow chart that can be used to determine an ADC_final value and calculate the received optical power. The method can include the steps shown in the flow chart of FIG. 8.

At step 20, the present temperature value (temp) is read. If the present temperature value temp is less than the temperature threshold value (temp_gate; e.g., a standard operating temperature, such as ambient temperature or 25° C.), low temperature functions will be employed, and the method proceeds to step 31. If the present temperature value temp is greater than the temperature threshold value temp_gate, then high temperature functions will be employed, and the method proceeds to step 32. In any embodiment, the temperature threshold value temp_gate may be equal to 25° C.

Step 20 is utilized to read the present temperature value temp and compare it with the temperature threshold value temp_gate to determine which of the low or high temperature functions to utilize. When the temperature value temp is greater than temp_gate, high temperature functions are employed; otherwise, low temperature functions are employed.

At step 31, the ADC value of channel 2 is read and compared to the ADC value ADC2_25 from channel 2 obtained when the power threshold value Tpower is determined at 25° C. (e.g., at −25 dBm). If the ADC value is less than ADC2_25, the ADC value determination will stay in channel 2. That is, the ADC value is equal to the ADC value of channel 2 obtained at the present temperature, and the method then proceeds to step 42. However, if the ADC value is greater than ADC2_25, the ADC value determination will sample values from channel 1. That is, the ADC value is the ADC value of channel 1 obtained at the present temperature, and the method then proceeds to step 41.

At step 32, the ADC value of channel 2 is read and compared to the ADC value ADC2_25 relative to channel 2 obtained when the power threshold value Tpower is determined at 25° C. (e.g., at −25 dBm). If the ADC value is less than ADC2_25, the ADC value determination will stay in channel 2. That is, the ADC value is the ADC value of channel 2 obtained at the present temperature, and the method goes to step 43. However, if the ADC value is greater than ADC2_25, the ADC value determination evaluation will proceed to channel 1. That is, the ADC value is the ADC value of channel 1 obtained at the present temperature, and the method then proceeds to step 44.

Steps 31 and 32 are utilized to read the ADC value of channel 2 of the receiver monitoring circuit and compare the obtained ADC value with the ADC value ADC2_25 from channel 2 obtained when the power threshold value Tpower is determined at 25° C. (e.g., at −25 dBm) to selectively determine which of channels 1 or 2 to use for ADC evaluation. If the ADC value is greater than ADC2_25, channel 1 will be employed. If the ADC value is less than ADC2_25, channel 2 will be employed. Namely, as discussed above, the method selects the DAC of channel 2 for measuring optical power in the range of −33 dBm to −25 dBm, and the DAC of channel 1 for measuring optical power in a range of −25 dBm to −5 dBm. In this mode, it can simplify the determination for selection of DAC evaluations or measurements.

At step 41, the obtained ADC value is compared with the value of ADC1_15+(ADC1_15L−ADC1_15)*(temp−tempN)/(tempL−tempN) at 15 dBm. ADC1-15 represents the ADC value of channel 1 as the input optical power reaches −15 dBm at an ambient temperature of 25° C., ADC1-15L represents an ADC value at the standard operating temperature converted from the ADC value of channel 1 as the input optical power reaches −15 dBm at ambient temperature of 0° C., temp represents the present temperature, tempN represents the temperature when normal temperature correction is applied, and tempL represents the temperature when low temperature correction is applied. If the obtained ADC value is greater than ADC1_15+(ADC1_15L−ADC1_15)*(temp−tempN)/(tempL−tempN), the method proceeds to step 51; otherwise, the method proceeds to step 52.

At step 42, the obtained ADC value is compared with the value of ADC2_25+(ADC2_25L−ADC2_25)*(temp−tempN)/(tempL−tempN) at 25 dBm, where ADC2-25 represents the ADC value of channel 2 as the input optical power reaches −25 dBm at an ambient temperature of 25° C., ADC2-25L represents the ADC value at standard temperature converted from the ADC value of channel 2 obtained when the input optical power reaches −25 dBm at 0° C. If the obtained ADC value is greater than ADC2_25+(ADC2_25L−ADC2_25)*(temp−tempN)/(tempL−tempN), the method proceeds to step 53; otherwise, the method proceeds to step 52.

At step 43, the obtained ADC value is compared with the threshold ADC2-25+(ADC2-25H−ADC2-25)*(temp−tempN)/(tempH−tempN) at 25 dBm, where ADC2-25 represents the ADC value of channel 2 as the input optical power reaches −25 dBm at an ambient temperature of 25° C., and ADC2-25H represents the ADC value at standard temperature converted from the ADC value of channel 2 as the input optical power reaches −25 dBm at about 70° C. If the obtained ADC value is greater than ADC2-25+(ADC2-25H−ADC2-25)*(temp−tempN)/(temple−tempN), the method proceeds to step 56; otherwise, it proceeds to step 55.

At step 44, the obtained ADC value is compared with the threshold ADC1_15+(ADC1_15H−ADC1_15)*(temp−tempN)/(tempH−tempN) at 15 dBm, where ADC1-15 represents the ADC value of channel 1 as the input optical power reaches −15 dBm at an ambient temperature of about 25° C., ADC1-15L represents an ADC value at a standard operating temperature converted from the ADC value of channel 1 as the input optical power reaches −15 dBm at about 70° C., temp represents the present temperature, tempN represents the temperature when normal temperature correction is utilized, and tempL represents the temperature when low temperature correction is utilized. If the obtained ADC value is greater than the value of ADC1-15+(ADC1-15H−ADC1-15)*(temp−tempN)/(tempL−tempN), the method proceeds to step 54; otherwise, the method proceeds to step 55.

Steps 41-44 can be utilized to determine the slope and offset of ADC conversion based on present ADC values and ADC threshold values at various temperatures and optical power values.

At step 51, slope is defined as slope1_15~5L, such that slope=slope1_15~5L, and offset is defined as offset1_15~5L, such that offset=offset1_15~5L, where slope1_15~5L and offset1_15~5L represent the slope and offset of channel 1, respectively, used for the optical power compensation curve at low temperature (e.g., at an input optical power between −5 dBm and −15 dBm). The method then proceeds to step 60.

At step 52, slope is defined as slope1_25~15L, such that slope=slope1_25~15L, and offset is defined as offset1_25~15L, such that offset=offset1_25~15L, where slope1_25~15L and offset1_25~15L represent the slope and offset of channel 1, respectively, used for the optical power compensation curve at low temperatures (e.g., at an input optical power between −25 dBm and −15 dBm). The method then proceeds to step 60.

At step 53, slope is defined as slope2_33~25L, such that slope=slope2_33~25L, and offset is defined as offset1_25~15L, such that offset=offset2_33~25L, where slope2_33~25L and offset2_33~25L represent the slope and offset of channel 2, respectively, used for the optical power compensation curve at low temperatures (e.g., at an input optical power between −33 dBm and −25 dBm). The method then proceeds to step 60.

At step 54, slope is defined as slope1_15~5H, such that slope=slope1_15~5H, and offset is defined as offset1-15~5H, such that offset=offset1-15~5H, where slope1-15~5H and offset1-15~5H represent the slope and offset of channel 1, respectively, used for the optical power compensation curve at high temperatures (e.g., at an input optical power between −15 dBm and −5 dBm). The method then proceeds to step 60.

At step 55, slope is defined as slope1_25~15H, such that slope=slope1_25~15H, and offset is defined as offset1-25~15H, such that offset=offset1-15~5H, where slope1-25~15H and offset1-25~15H represent the slope and offset of channel 1, respectively, used for the optical power compensation curve at high temperatures (e.g., at an input optical power between −25 dBm and −15 dBm). The method then proceeds to step 60.

At step 56, slope is defined as slope2_33~25H, such that slope=slope2_33~25H, and offset is defined as offset2_33~25H, such that offset=offset2_33~25H, where slope2-33~25H and offset2-33~25H respectively represent the slope and offset of channel 2 for use in the optical power compensation curve at high temperature (e.g., at an input optical power between −33 dBm and −25 dBm). The method then proceeds to step 60.

Steps 51-56 can be utilized to define slopes and offsets based on comparison results, where the slopes and offsets use samples of actual ADC values (e.g., ADC_sample truth-values) as horizontal ordinates, and the differences between the ADC_sample truth-value and the ADC_calibration represents the slope and offset of a curve drawn along vertical coordinates. Furthermore, ADC_sample represents an ADC value sampled for a currently tested input optical power, and ADC_calibration represents an ADC value obtained after correction or calibration.

At step 60, an ADC_final value at standard temperature is determined according to the equation ADC_final=ADC−(ADC*slope+offset)*(temp−temp_gate)/(tempH/L−temp_ where tempH/L represents the high or low temperature, as the case may be. Additionally, the ADC_final value is compared to various corrected values obtained at normal or ambient temperature (e.g., 25° C.) to determine the location or value of the ADC_final value (e.g., between two data points), as well as the value of slope-f and offset-f between the two data points. Slope-f and offset-f represent the slope and offset calculated after temperature compensation is applied. The present temperature value temp and the ADC_final value at standard temperature are then inserted into a piecewise standard function to calculate the received optical power Rxpower. Thus, step 60 determines the final ADC value at standard temperature according to ADC_final=ADC−(ADC*slope+offset)*(temp−tempN)/(tempH/L−tempN).

The flow of the present invention in the above embodiment is not intended to be exhaustive or to limit the invention to the precise forms disclosed, and obviously many modifications and variations are possible in light of the above teachings. The spirit of the present invention enables others skilled in the art to best utilize the invention and various embodiments with various modifications as are suited to the particular use contemplated. For example, the variables temp_gate, tempH and tempL can be given various values based on various circumstances. In addition, with regard to piecewise calculation, individual slope and offset can be employed for each section based on accuracy requirements or various segmentation modes. There are three sections having various slopes and offsets in the embodiment, which indicates that one skilled in the art can determine the number of sections based on the actual situation.

While the invention has been described in conjunction with the above-mentioned preferred embodiments, it will be understood that the descriptions are not intended to limit the invention to these embodiments. On the contrary, the invention is intended to cover modifications and equivalents that may be included within the spirit and scope of the invention as defined by the present invention.

What is claimed is:

1. A circuit for monitoring an optical receiver, wherein said circuit comprises:
    an avalanche photodiode (APD);
    a multipath constant flow source configured to convert photocurrent from the APD into first and second currents, the second current having a value different from that of the first current;
    a first amplifier having a first gain, configured to receive the first current from the APD and provide a first voltage signal;
    a second amplifier having a second gain different from the first gain, configured to receive the second current from the APD and provide a second voltage signal;
    a microprocessor configured to (i) supply a bias voltage to the APD and (ii) determine an optical power from the first and second voltage signals; and
    a digital to analog converter (DAC) that receives an output from the microprocessor and provides a voltage to the multipath constant flow source.

2. The circuit of claim 1, further comprising a first sampling circuit connecting the microprocessor to the first amplifier.

3. The circuit of claim 2, further comprising a first voltage follower connecting the microprocessor to the first sampling circuit.

4. The circuit of claim 3, further comprising a first analog-to-digital converter (ADC) that converts an output of the first voltage follower into a digital value.

5. The circuit of claim 1, further comprising a second sampling circuit connecting the microprocessor to the second amplifier.

6. The circuit of claim 5, further comprising a second voltage follower connecting the microprocessor to the second sampling circuit.

7. The circuit of claim 6, further comprising a second analog-to-digital converter (ADC) that converts an output of the second voltage follower into a digital value.

8. A circuit for monitoring an optical receiver, comprising:
an avalanche photodiode (APD) having a cathode terminal electrically connected to a power supply;
a microprocessor having a first analog-to-digital (ADC) port, a second ADC port, and a digital-to-analog (DAC) port;
a first amplifier;
a second amplifier;
a current mirror electrically connected to an anode of the APD and to the first and second amplifiers;
a boosted circuit electrically connected to the DAC port and to the current mirror; and
a first sampling circuit electrically connecting the first amplifier to a first voltage follower;
wherein the microprocessor is electrically connected to the first voltage follower via the first ADC port, and
the first amplifier, the first sampling circuit, the first voltage follower, and the first ADC port form a first channel.

9. The circuit of claim 8, further comprising:
a second voltage follower and a second sampling circuit electrically connecting the second amplifier to the second ADC port of the microprocessor;
wherein the second amplifier, the second sampling circuit, the second voltage follower and the second ADC port form a second channel.

10. The circuit of claim 9, wherein the first channel has a gain that is less than a gain of the second channel.

11. The circuit of claim 10, wherein the microprocessor selectively monitors an optical power of the first channel or the second channel.

12. The circuit of claim 8, wherein the current mirror converts a photocurrent from the APD into first and second currents, the second current being different from the first current.

13. The circuit of claim 12, wherein the first current is received by the first amplifier in a first channel and supplied to the first ADC port of the microprocessor.

14. The circuit of claim 13, wherein the second current is received by the second amplifier in a second channel and supplied to the second ADC port of the microprocessor.

15. A method of monitoring optical power, comprising:
comparing a measured temperature with a threshold temperature and determining whether to select a low temperature function or a high temperature function based on the comparison;
determining a first optical power value of a first channel, a second optical power value of a second channel, and converting the first and second optical power values to digital optical power values using an analog-to-digital converter (ADC), the first channel and the second channel having different power ranges;
capturing ADC optical power values of the first channel and the second channel and converting the digital optical power values into final digital optical power values at a standard temperature; and
determining piecewise power functions for the final digital optical power values based on final digital optical power values at the standard temperature, and calculating a received optical power using the final digital optical power values and the piecewise power functions.

16. The method of claim 15, wherein determining whether to select a low temperature function or a high temperature function comprises selecting and using the high temperature function when the measured temperature value is greater than the threshold temperature, and selecting and using the low temperature function when the measured temperature value is less than the threshold temperature.

17. The method of claim 16, wherein the threshold temperature is 25° C.

18. The method of claim 15, wherein determining and converting the digital optical power values comprises comparing the digital optical power values of the second channel with a predetermined set of digital optical power values of the second channel when the optical power equals a first threshold power at a standard operating temperature, and determining temperature-corrected optical power values by calculating a difference value based on a result of the comparison.

19. The method of claim 18, wherein the first power threshold is about −25 dBm and the standard operating temperature is 25° C.

20. The method of claim 15, wherein the high temperature is about 70° C., and the low temperature is about 0° C.

21. The method of claim 20, wherein the first power threshold is less than a saturation power of a one of the first channel and the second channel having a highest gain.

22. The method of claim 15, wherein the first channel comprises a first amplifier, a first voltage follower, and a first sampling circuit that electrically connects the first amplifier to the first voltage follower.

23. The method of claim 22, wherein the first voltage follower electrically connects a microprocessor to the first sampling circuit.

24. The method of claim 22, wherein the second channel comprises a second amplifier, a second voltage follower, and a second sampling circuit that electrically connects the second amplifier to the second voltage follower.

25. The method of claim 24, wherein the second voltage follower electrically connects a microprocessor to the second sampling circuit.

* * * * *